United States Patent [19]

Momona

[11] Patent Number: 5,440,555

[45] Date of Patent: Aug. 8, 1995

[54] ACCESS SYSTEM

[75] Inventor: Morihisa Momona, Tokyo, Japan

[73] Assignee: NEC Corporation, Tokyo, Japan

[21] Appl. No.: 111,552

[22] Filed: Aug. 25, 1993

[30] Foreign Application Priority Data

Aug. 27, 1992 [JP] Japan .................................. 4-228117

[51] Int. Cl.$^6$ .............................................. H04J 3/16
[52] U.S. Cl. ..................................... 370/79; 370/85.8; 340/825.08
[58] Field of Search ................. 370/79, 84, 85.2, 85.3, 370/85.7, 85.8, 85.9, 85.11, 95.1, 95.2; 340/825.08

[56] References Cited

U.S. PATENT DOCUMENTS 4,763,323 8/1988 Nelson et al. .................. 370/85.8 X

*Primary Examiner*—Melvin Marcelo
*Attorney, Agent, or Firm*—Sughrue, Mion, Zinn, Macpeak & Seas

[57] ABSTRACT

An object of the present invention is to provide an access system which can accommodate constant bit rate data irrespective of the traffic conditions and which also allows accommodation of variable bit rate data at a high circuit utilization efficiency. The access system is constructed such that a master station first performs allocation of transmission right for constant bit rate data to all of slave stations for each transmission period for constant bit rate data. The master station does not immediately perform allocation but reserves requests for transmission right for variable bit rate data, and after allocation of transmission right for constant bit rate data to all of the slave stations, the master station allocates the requests for transmission right for variable bit rate data to non-used regions within the transmission period.

8 Claims, 14 Drawing Sheets

FIG. 9

ASCENDING CIRCUIT SPEECH BURST SIGNAL CONTROL SLOT

| GUARD TIME | PRE-AMBLE | UNIQUE WORD | ADDR-ESS | COMM-AND | SPEECH RESERVATION AMOUNT | SPEECH TRANSMIS-SION AMOUNT | PACKET RESERVATION AMOUNT | CRC |
|---|---|---|---|---|---|---|---|---|

DESCENDING CIRCUIT CONTROL SLOT

| FRAME BIT | CONTROL/DATA SLOT IDENTIFI-CATION | ADDR-ESS | COMM-AND | SPEECH ALLOCATION AMOUNT | SPEECH TRANS-MISSION | PACKET ALLOCATION AMOUNT | PACKET TRANSMISSION TIMING | CRC |
|---|---|---|---|---|---|---|---|---| ns
ACCESS SYSTEM

BACKGROUND OF THE INVENTION

1. Field of the Invention

This invention relates to a communication system of the multiple access type which is constituted from a master station and a plurality of slave stations, a broadcasting channel which allows communication from the master station to all of the slave stations, and a multiple access channel which allows communication from all of the slave stations to the master station, and more particularly to a communication system which can accommodate constant bit rate data and variable bit rate data.

2. Description of the Related Art

A polling system wherein a master station successively sends transmission instructions to a plurality of slave stations and the slave stations successively send out information in response to the instructions is well known as one of communication systems of the multipoint type. Communication systems of the multiple access type are disclosed, for example, in Japanese Patent Laid-Open Application No. Showa 62-21331 and Japanese Patent Laid-Open Applications Nos. Showa 62-23236 to 62-23239.

In addition, as a system which accommodates constant bit rate data and variable bit rate data in communication of the multiple access type, a system is disclosed, for example, in *IEEE Transactions on Communications*, Vol. 37, No. 8, pp. 885–889, Aug. 1989, wherein a slave station acquires the transmission right for variable bit rate data and constant bit rate data in accordance with a CSMA/CD (Carrier Sense Multiple Access with Collision Detection) system and starts transmission of constant bit rate data. Once the slave station acquires a slot, the master station allows the slave station to thereafter access the slot, which is at the position of each transmission period of the constant bit rate data as counted from the acquired slot, until the transmission of the constant bit rate data is completed. At the same time, the master station informs all of the other slave stations of the restriction of access to the slot.

In the conventional access system, transmission of constant bit rate data from a slave station sometimes collides upon starting with constant bit rate data or variable bit rate data from another slave station, and the slave station acquires the transmission right only after some delay of time. Further, since the rate of occurrence of collisions increases as the traffic increases, there is another problem in that the utilization efficiency of the circuit is low.

Summary of the Invention

In order to solve the problems described above, in accordance with an access system according to the present invention, each of a plurality of slave stations requests the master station for the transmission right for constant bit rate data and variable bit rate data. For the request for the transmission right for constant bit rate data from each of the slave stations, the master station allocates, for each transmission period for constant bit rate data which depends upon the transmission bit rate of the constant bit rate data, the transmission right for constant bit rate data to all of the slave stations. On the other hand, for the request for variable bit rate data from each of the slave stations, the master station successively allocates, after the allocation of the transmission right for constant bit rate data, the requests for the transmission right for variable bit rate data to a non-used region of the circuit in the transmission period of the constant bit rate data in the same order in which the requests for the transmission right were accepted.

Brief Description of the Drawings

FIG. 9 is a diagrammatic view showing the format of signals in ascending and descending circuits of the third embodiment of the present invention;

Detailed Description of the Preferred Embodiments

The present invention will be described with reference to the drawings.

Figure 1:
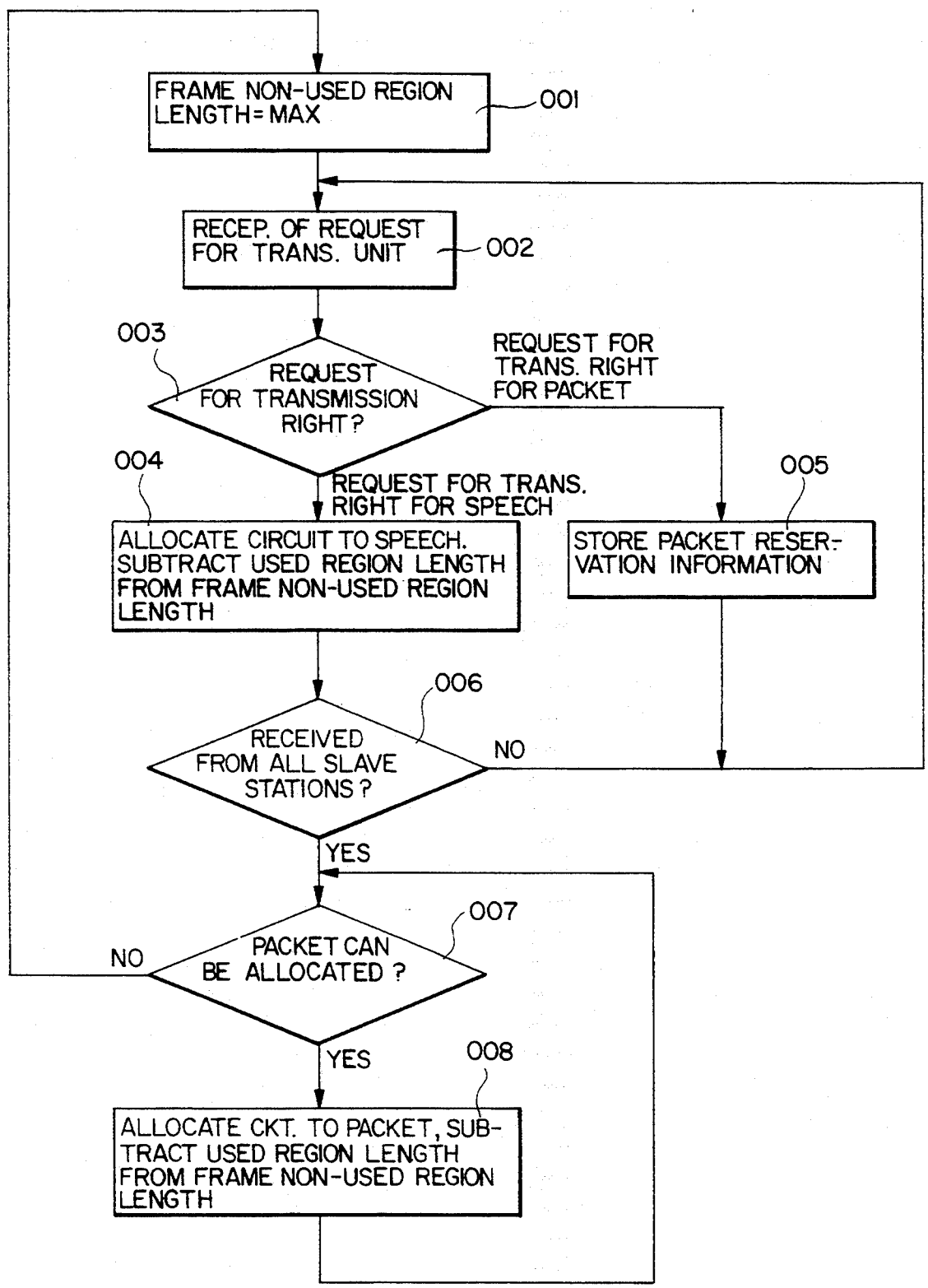
FIG. 1 is a flow chart illustrating the procedure of a first embodiment of the present invention.

FIG. 1 is a flow chart of the procedure of allocation of the transmission right by a master station according to a first embodiment of the present invention. The master station performs allocation in response to requests for the transmission right for speech and packets from a plurality of slave stations. The master station makes a plan for allocation of the circuit for speech and packets for each transmission period (hereinafter referred to as frame) of speech. To this end, the master station has means for counting the length of a non-used region in a frame. Further, the master station has storage means of the FIFO type for holding information on requests from the slave stations for the transmission right for packets.

The master station initializes the length of the non-used region of a frame to the length of one frame in advance (step 001). When the master station receives a request for the transmission right (step 002), it checks whether or not the data that is the object of the request for the transmission right is speech or a packet (step 003). When the object data is a request for the transmission right for a packet, it is stored into the storage apparatus of the FIFO (First-in First-out) type (step 005). In contrast, when the object data are a request for the transmission right for speech, the master station successively allocates different regions beginning with the top of the frame and subtracts the total length of the used region from the length of the non-used region (step 004). The master station holds a list of all of the slave stations, and each time it allocates the transmission right for speech to a slave station, it checks which slave station it has given the allocation. When allocation of the transmission right for speech to all of the slave stations is not completed, the operation of the master station advances to processing for next reservation information, but when allocation of the transmission right for speech to all of the slave stations is completed, the operation of the master station advances to allocation of the transmission right for a packet which will be hereinafter described (step 006). The master station takes the requests for the transmission right for a packet from the storage apparatus in the order in which it has received them. If the total length of a packet can be accommodated in the non-used region of the frame (step 007), the master station allocates the transmission right according to the request for the transmission right for a packet and subtracts the length of the used region from the length of the non-used region, and the operation thereof then advances to allocation for a next packet (step 008). If it is impossible to accommodate the packet into the non-used region of the frame, the allocation procedure for a packet is stopped, and the operation of the master station advances to allocation for a next frame (step 007).

Figure 2:
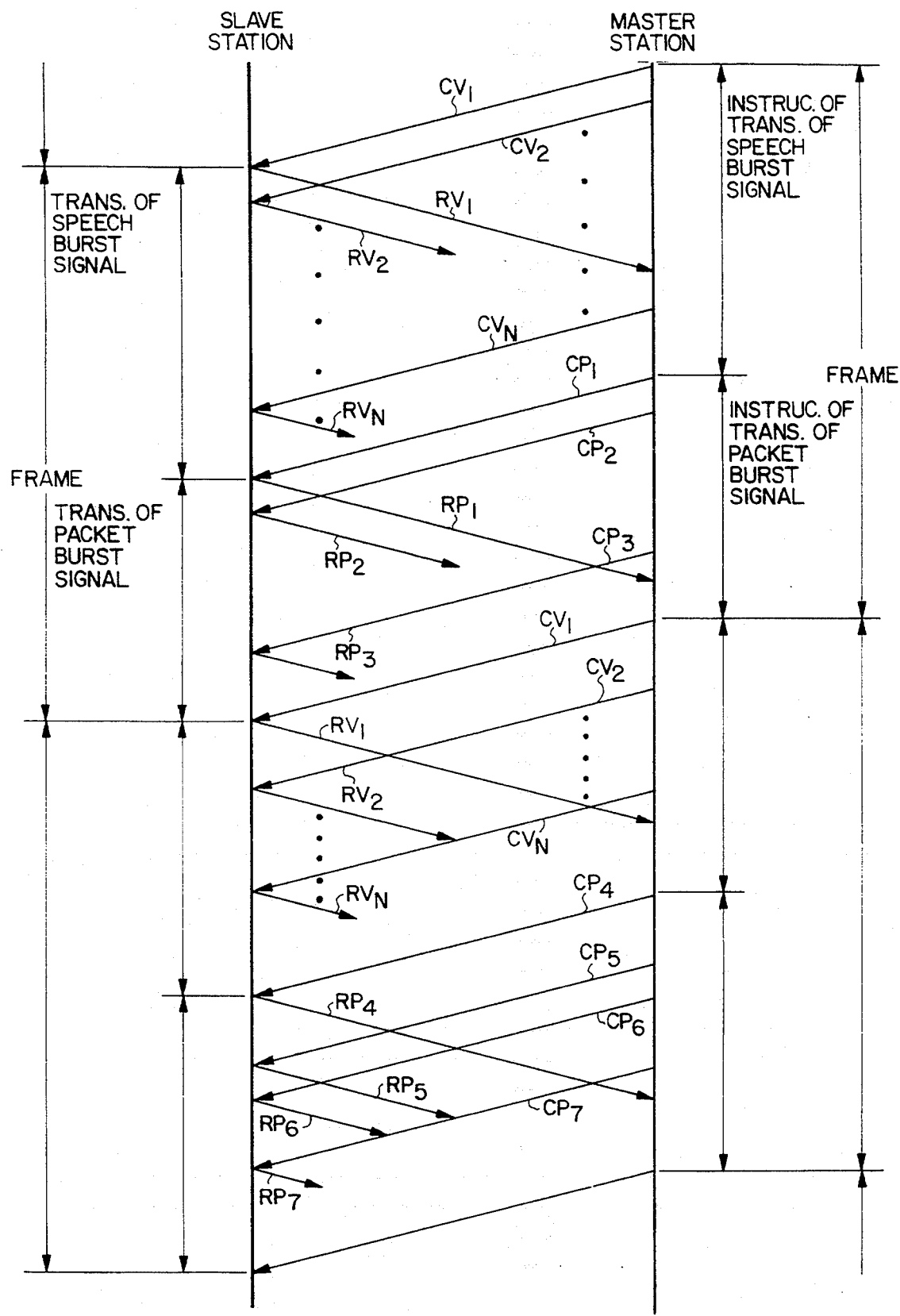
FIG. 2 is a sequence chart illustrating the procedure of a second embodiment of the present invention.

FIG. 2 illustrates the control sequence between a master station and slave stations according to a second embodiment of an access system according to the present invention. A descending signal from the master station is a continuous signal of the broadcasting type, and a control signal to each slave station in the continuous signal is indicated by a leftwardly directed arrow. Another signal to be transmitted from each slave station to the master station is a burst signal which is produced intermittently and is indicated by a rightwardly directed arrow. Each of the slave stations transmits a designated burst signal in synchronism with the control signal. The burst signal transmitted from the slave stations involves four kinds of signals including a speech reservation burst signal consisting only of reservation information for speech, a speech information burst signal consisting of reservation information for speech and speech information, a packet reservation burst signal consisting only of reservation information for a packet, and a packet information burst signal consisting of reservation information for a packet and packet information.

As shown in FIG. 2, within a frame period, the master station first transmits to all of the slave stations in the former half of the frame a control signal which instructs transmission of a speech reservation burst signal or a speech information burst signal. Then, in the remaining region of the frame, the master station successively transmits to each of the slave stations a control signal which instructs transmission of a packet reservation burst signal or a packet information burst signal. In FIG. 2, an instruction of transmission of a speech reservation burst signal or a speech information burst signal to each slave station is denoted by CVn, and an instruction of transmission of a packet reservation burst signal or a packet information burst signal is denoted by CPn. Upon reception of the control signal from the master station, each slave station transmits the instructed burst signal. In FIG. 2, transmission of a speech reservation burst signal or a speech information burst signal from each slave station is denoted by RVn, and transmission of a packet reservation burst signal or a packet information burst signal is denoted by RPn. Based on reservation information included in a burst signal from each slave station, the master station performs allocation of the transmission right for a next frame in accordance with the allocation system described in the description of the first embodiment above. A control signal is transmitted to each slave station in accordance with the allocation.

Figure 3:
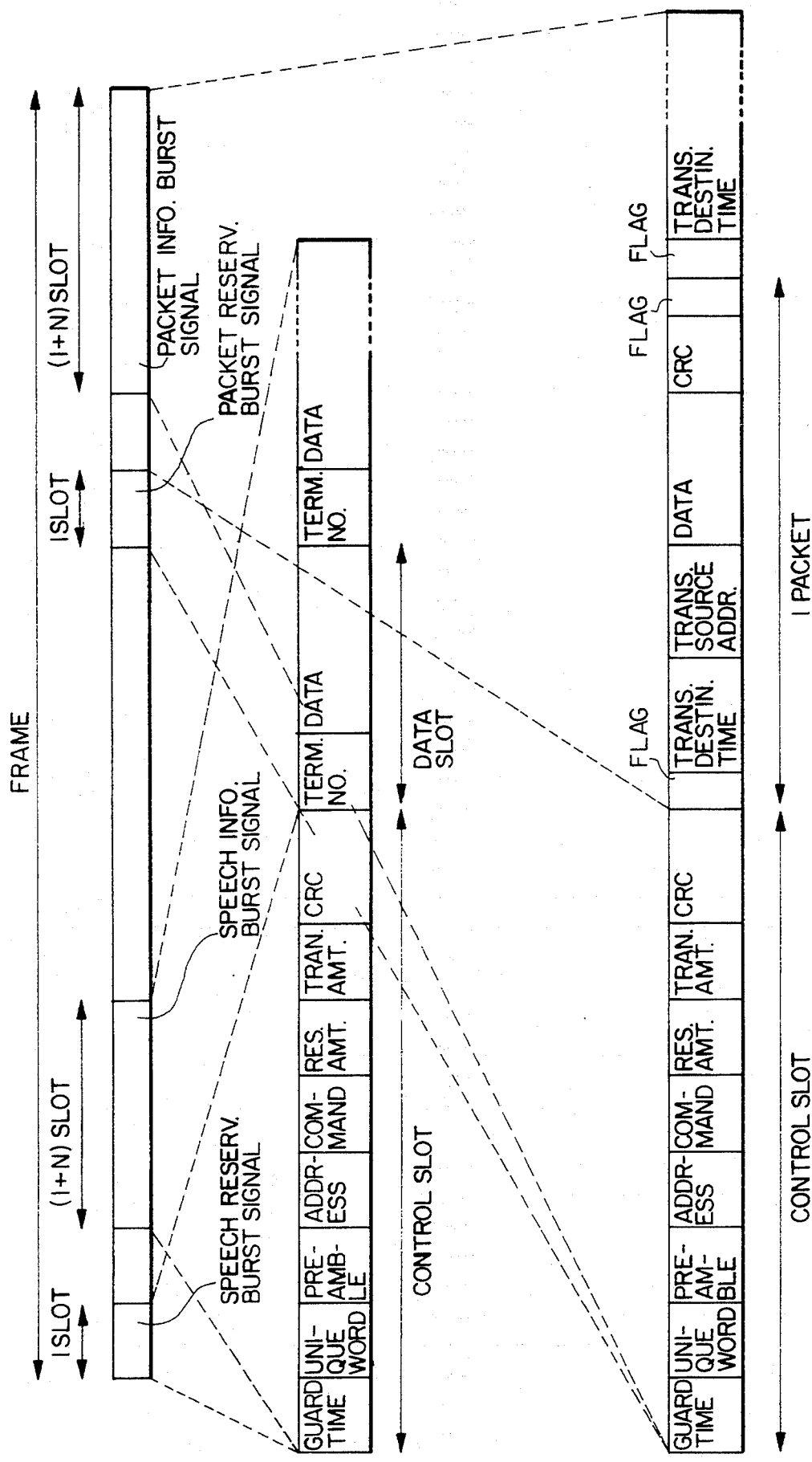
FIG. 3 is a diagrammatic view showing the format of a signal in an ascending circuit of the second embodiment of the present invention.

Next, the formats of signals in the ascending and descending circuits for realizing the access system described above will be described. FIG. 3 is a diagrammatic view showing the format of a signal in the ascending circuit in the second embodiment. A signal to be transmitted from each slave station to the master station is a burst signal. Each burst signal has a length equal to an integral number times the length of a slot, and the burst signals are multiplexed in the ascending circuit using the multiple access technique.

The burst signal is constituted only from a control slot when it is a reservation burst signal, but when it is an information burst signal, it is constituted from a control slot and a data slot succeeding the control slot.

In the format of a control slot for a burst signal of FIG. 3, the guard time is a non-transmission bit (or bits) for preventing an overlap of burst signals from different slave stations which may be caused by displacement of timings of the burst signals; the preamble is a burst signal synchronizing bit (or bits) on the master station side; the unique word is a bit pattern for detection of the burst top position on the master station side; the address is a number peculiar to each slave station; the command is a designation of a type of the burst to be transmitted; the reservation amount is the number of slots of data requested to be transmitted in a next cycle; the transmission amount is the number of slots of data to be transmitted in the current cycle; and the CRC is a bit train for detection of an error of the control slot by a generating function. The burst signal to be designated by the command involves four kinds of signals including a speech reservation burst signal, a speech information burst signal, a packet reservation burst signal and a packet information burst signal.

The data slot designates a format and an address terminal by different designation methods for speech and packets. When the data slot is for speech, one slot corresponds to speech information from one terminal. But when the data slot is for a packet, there is no one-by-one corresponding relationship between a slot and a packet, the inside of a plurality of slots being sectioned freely to accommodate a plurality of packets therein. Each two adjacent packets are sectioned by a flag. When the data slot is for speech, a destination terminal is designated by two different pieces of information including a slave station address included in a preceding control slot and a terminal number included in the data slot and unique to the slave station. The destination terminal of packet data is designated only with a terminal address unique among all of the slave stations, but the slave station address of the control slot is not used. Each packet has two fields: one for a source address and one for a destination address.

Figure 4:
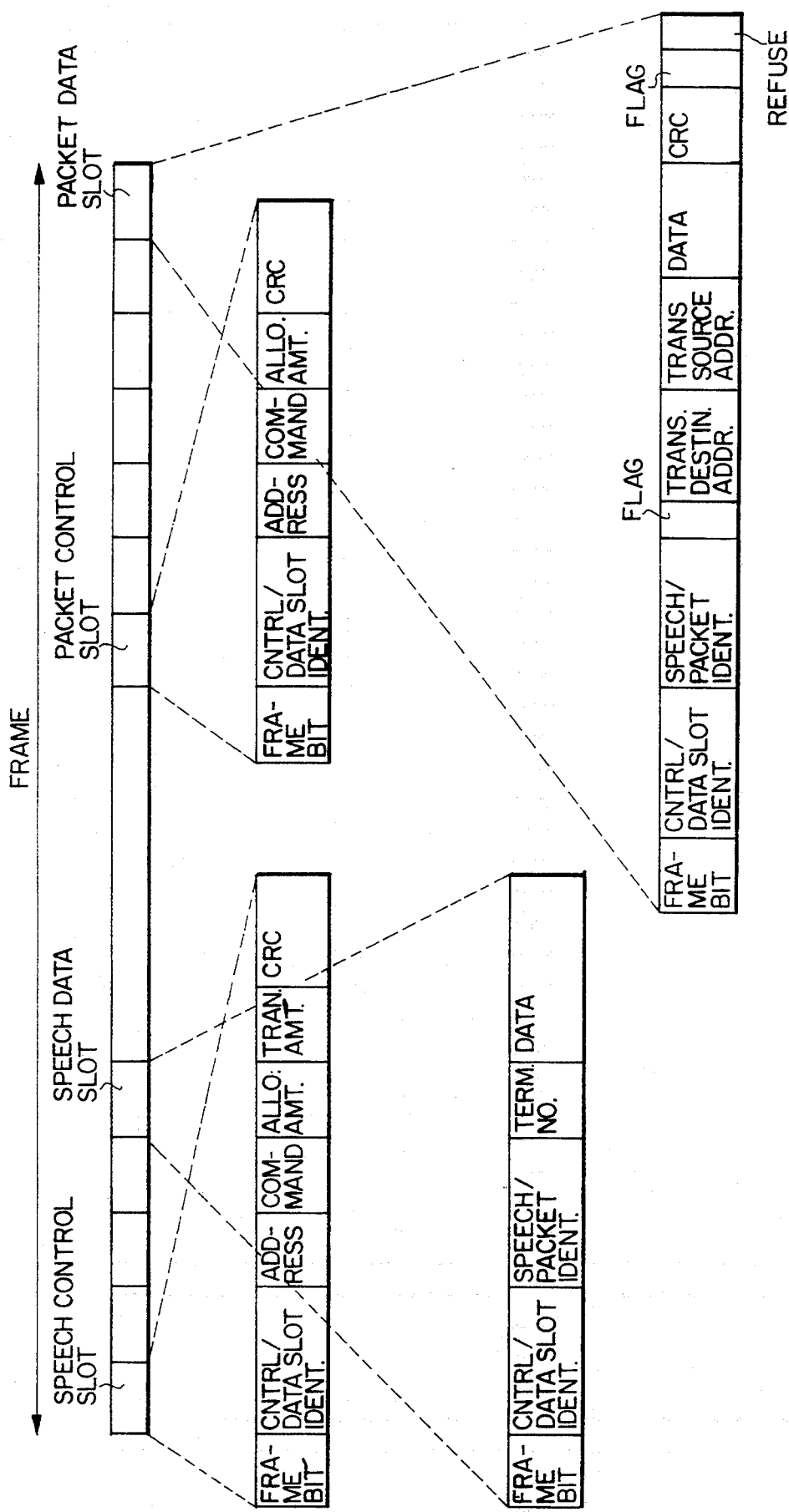
FIG. 4 is a diagrammatic view showing the format of a signal in a descending circuit of the second embodiment of the present invention.

FIG. 4 is a diagrammatic view illustrating the format of a signal in the descending circuit in the second embodiment. A signal of the descending circuit is a continuous signal. All slots in a frame have a frame bit (or bits) and a control slot/data slot identification bit. The frame bit is (or bits are) a bit (or bits) for frame synchronization detection on the slave station side. The control slot/data slot identification bit is a bit for distinguishing on the slave station side between a control slot for sending control information to each slave station and a data slot for data transfer.

The control slot is constituted from the fields of the slave station taken as the object for control and includes an address, a command to the slave station, an allocation amount of speech or a packet to the slave station, and a CRC for error detection of the control slot. The command designates which one of a speech reservation burst signal, a speech information burst signal, a packet reservation burst signal and a packet information burst signal is to be transmitted. When information taken as the object for control is speech, a data slot for speech to the slave station is transmitted next to the control slot. To this end, the control slot for speech has a field for the transmission amount of speech to be transmitted to the slave station.

The data slot has different formats for speech and packets, similarly to the ascending circuit. The data slot has a bit for distinguishing between speech and a packet. The data slot for speech has a format similar to that in the ascending circuit and is transmitted next to a control slot for speech to the slave station in which the destination terminal is accommodated. When one packet is longer than one data slot for a packet, the data slot for a packet is divided and transmitted in a plurality of slots, but when the packet length is shorter than the one slot length, a plurality of packets are included in one slot for transmission. The data slot for a packet is transmitted using an empty slot irrespective of a control slot for a slave station in which a destination terminal is accommodated.

Operation of the slave stations and the master station in the present invention will be described below.

Figure 5:
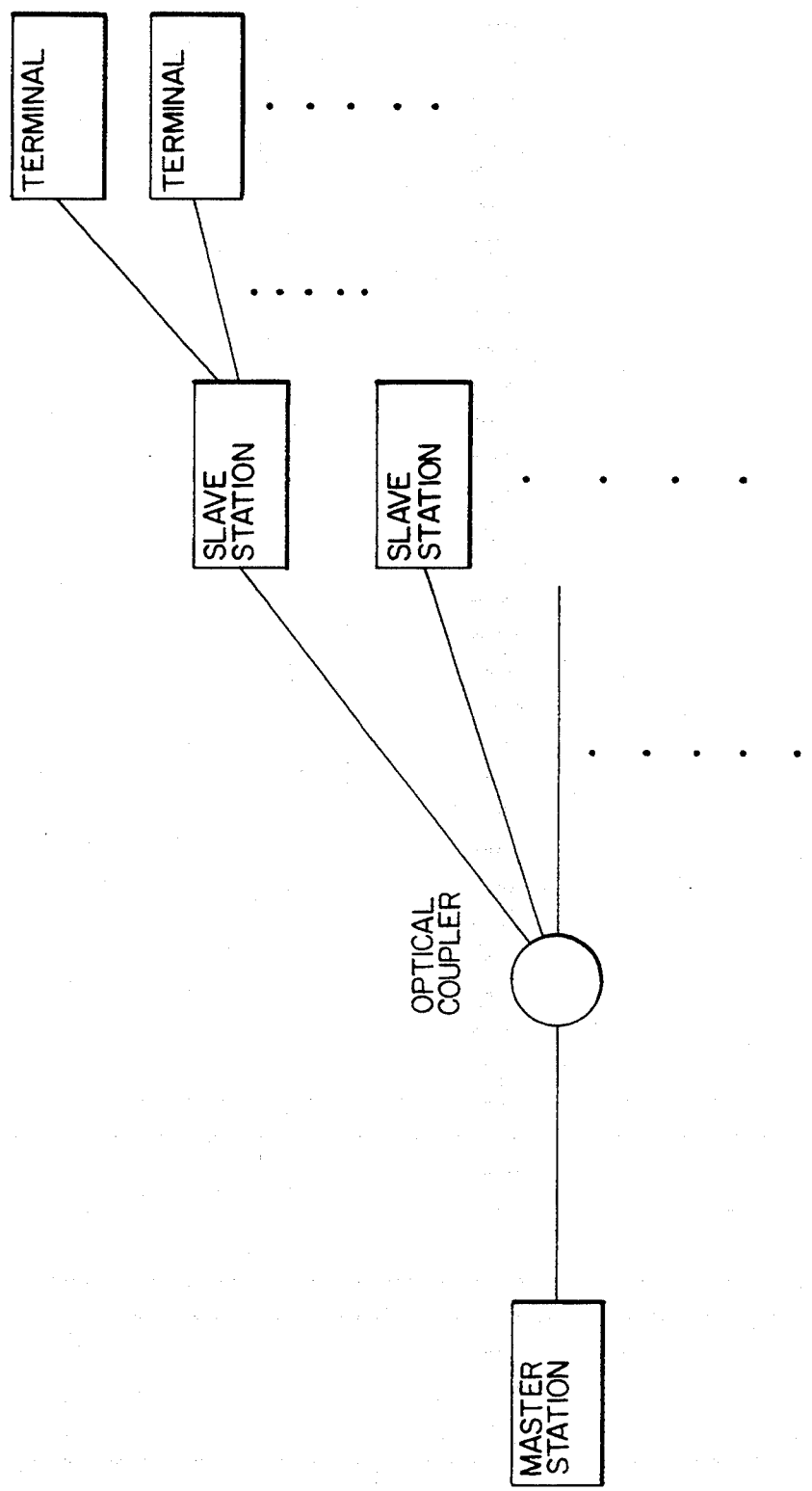
FIG. 5 is a block diagram showing the construction of a system to which an access system of the present invention is applied.

FIG. 5 shows the construction of the entire system in the second embodiment. The system is constituted from one master station and a plurality of slave stations, and a plurality of terminals are accommodated in each of the slave stations. Each of the master station and the slave stations includes a transmission apparatus and a reception apparatus. An optical fiber is used as a transmission medium for a signal between the master station and the slave stations, and the transmission line has a star-shaped topology with optical couplers interposed intermediately therein.

Figure 6:
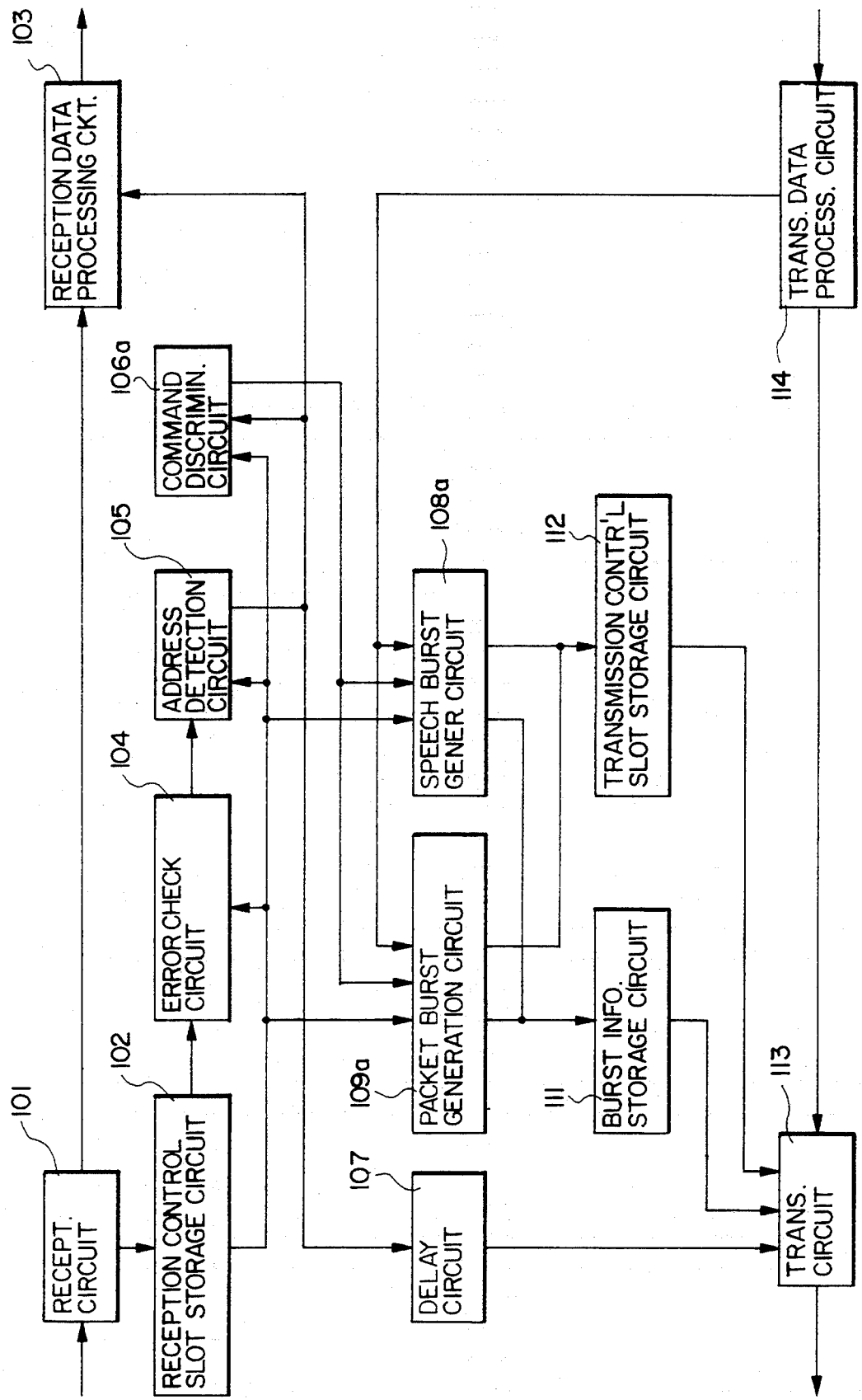
FIG. 6 is a block diagram illustrating the functions of a slave station of the second embodiment of the present invention.

FIG. 6 is a functional block diagram of a slave station in the second embodiment. Referring to FIG. 6, a signal in the descending circuit is supplied to a reception circuit 101 of the slave station. In the reception circuit 101, the frame bit of each slot of the reception signal is detected to establish frame synchronization, and the reception signal and the slot synchronizing signal are supplied to a reception control slot storage circuit 102 and a reception data processing circuit 103. The reception control slot storage circuit 102 extracts, based on the slot synchronizing signal, the control slot/data slot identification bit in the slot. When a control slot is detected, an error check circuit 104 is activated. The error check circuit 104 extracts a CRC field from the reception control slot to conduct an error check of the reception control slot, and if the reception control slot has no error, an address detection circuit 105 is activated. The address detection circuit 105 extracts the address field from the reception control slot and compares the address with the address of the slave station. When the control slot received is destined for the slave station, a command discrimination circuit 106a is activated so that a transmission timing for a burst to the master station is set to a delay circuit 107. Further, the address detection circuit 105 always informs the reception data processing circuit 103 of a result of the comparison between the addresses.

The reception data processing circuit 103 extracts the speech/packet identification bit from the data slot based on the slot synchronizing signal. When a data slot for speech is received, if it has been notified from the address detection circuit 105 that the preceding control slot is destined for the slave station, the reception data processing circuit 103 fetches the slot. On the other hand, when a packet data slot is received, if the destination address designates one of the terminals accommodated in the slave station, the reception data processing circuit 103 fetches the slot.

The command discrimination circuit 106a extracts a command field from the reception control slot and checks whether the object for control of the command is speech or a packet. When the object for control is an instruction of transmission of a speech burst signal, a speech burst generation circuit 108a is activated, but when the object for control is an instruction of transmission of a packet burst signal, a packet burst generation circuit 109a is activated. The speech burst generation circuit 108a checks the instruction of the command and determines generation of a reservation or information burst. Then, the reservation amount of speech for the master station is taken from a transmission data processing circuit 114, and when an information burst is to be generated, the allocation amount of speech is taken from the reception control slot. The speech burst generation circuit 108a generates a control slot for a burst signal from the command, the speech reservation amount and the speech allocation amount described above. The control slot generated is stored into a transmission control slot storage circuit 112, and the kind and the transmission amount of the data to be transmitted are set to a burst information storage circuit 111. The packet burst generation circuit 109a performs processing of a packet which is similar to the processing performed by the speech burst generation circuit 108a. When the set transmission timing comes, the delay circuit 107 instructs a transmission circuit 113 to transmit of a burst.

The transmission circuit 113 transmits the control slot into the ascending circuit. Then, in accordance with information of the data slot of the burst information storage circuit 111, a data slot for speech or a packet is taken out from the transmission data processing circuit 114 and transmitted into the ascending circuit.

Figure 7:
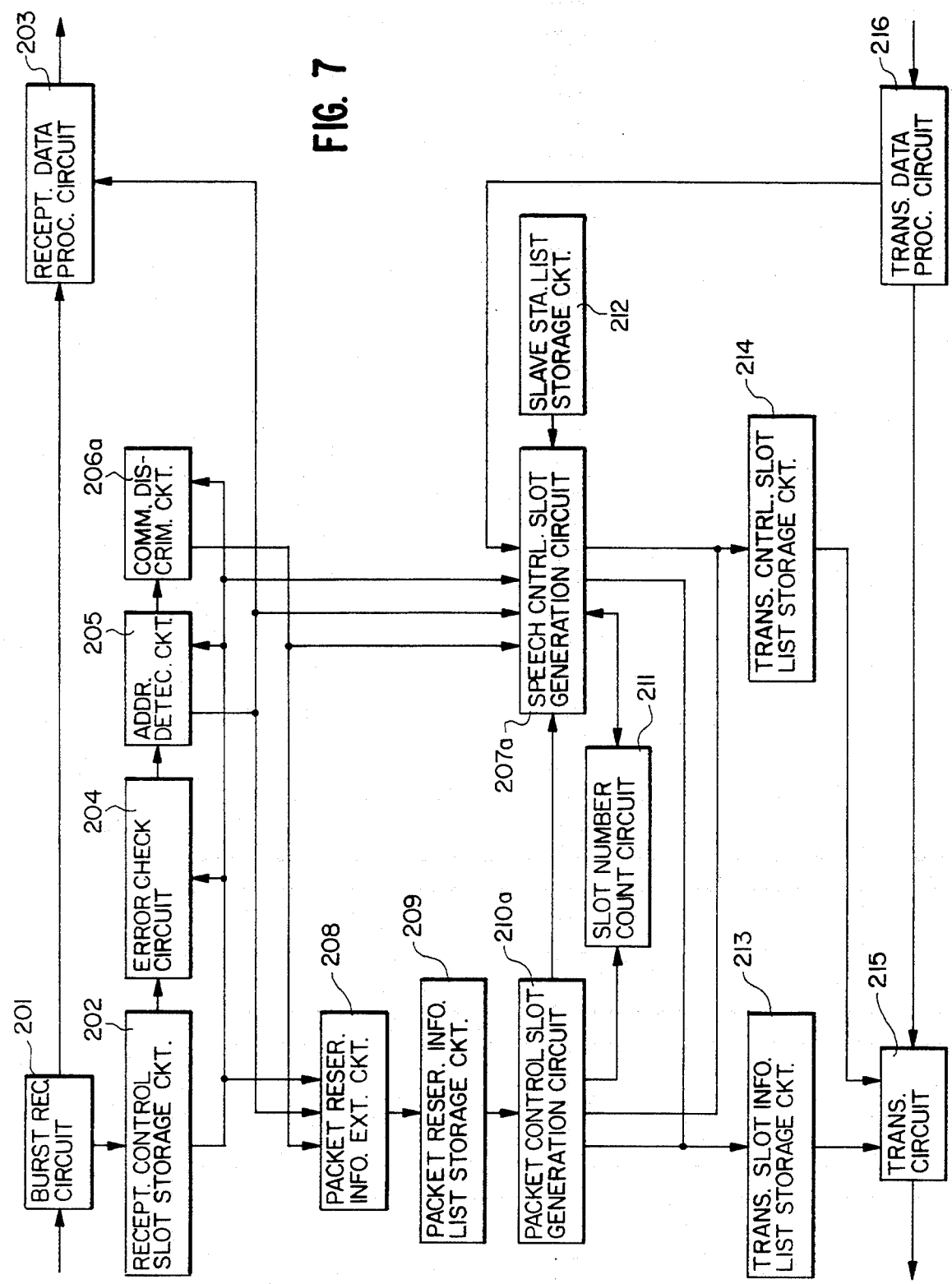
FIG. 7 is a block diagram illustrating the functions of the master station of the second embodiment of the present invention.

FIG. 7 is a functional block diagram of the master station in the second embodiment. A signal an the ascending circuit is supplied to a burst reception circuit 201. The burst reception circuit 201 detects a clock pulse of a burst based on the preamble and detects the top position of the burst based on the unique word, and the control slot, from which the preamble and the unique word have been removed, is stored into a reception control slot storage circuit 202, after which an error check circuit 204 is activated. A data slot next to the control slot is supplied to a reception data processing circuit 203 together with a slot synchronizing signal.

The error check circuit 204 performs an error check of the reception control slot using the CRC field extracted from the reception control slot, and if the reception control slot has no error, an address detection circuit 205 is activated. The address detection circuit 205 extracts an address field from the reception control slot, supplies the address field to the reception data processing circuit 203, a speech control slot generation circuit 207a, and a packet reservation information extraction circuit 208, and activates a command discrimination circuit 206a.

The reception data processing circuit 203 fetches a data slot based on the slot synchronizing signal. When the data slot is a speech data slot, a transmission source is identified from a slave station address supplied from the address detection circuit 205 and a terminal number in the data slot. When the data slot is a packet data slot, a transmission source and a transmission destination are identified from a transmission address and a transmission destination address in the data slot.

The command discrimination circuit 206a extracts the command field from the reception control slot and checks which one of speech and a packet the object of the command is. When a speech burst is received, the speech control slot generation circuit 207a is activated, but when a packet burst is received, the packet reservation information extraction circuit 208 is activated. The packet reservation information extraction circuit 208 extracts the reservation amount of a packet from the reception control slot and stores the slave station address and the reservation amount into a packet reservation information list storage circuit 209. The packet reservation information list storage circuit 209 is a storage circuit of the FIFO type and successively stores received packet reservation information.

The speech control slot generation circuit 207a extracts the reservation amount of speech from the reception control slot and determines an allocation amount. Further, the speech control slot generation circuit 207a sets the command of a control slot to be transmitted to an instruction of transmission of a reservation burst when the allocation amount is 0, but to an instruction of transmission of an information burst when the allocation amount is not equal to 0. Further, the transmission amount of speech to the slave station taken as the object for transmission is taken from a transmission data processing circuit 216. The speech control slot generation circuit 207a then generates a control slot from the command, the reservation amount and the transmission amount described above and stores the control slot into a transmission control slot list storage circuit 214. The transmission control slot list storage circuit 214 is a circuit for storing control slots to be transmitted in a next frame in order.

After the control slot is generated and the data slot to be transmitted to the slave station next to the control slot is determined, the speech control slot generation circuit 207a writes information of the slot to be transmitted into a transmission slot information list storage circuit 213. The transmission slot information list storage circuit 213 holds therein information that is taken out when the transmission circuit 215 is to transmit slots for a descending frame, necessary slots from the transmission control slot list storage circuit 214 and transmission data processing circuit 216. The information thus held differs depending upon whether a slot to be transmitted is a control slot or a data slot. When the slot to be transmitted is a control slot, information on the stored location of the transmission control slot list storage circuit 214 is held, but when the slot to be transmitted is a data slot, a distinction between a speech data slot and a packet data slot is held. When the data slot is a speech data slot, a slave station address to be designated when the information is to be taken from transmission data processing circuit 216 is held.

Further, the speech control slot generation circuit 207a informs a slot number count circuit 211 of the numbers of control slots and data slots to be transmitted. The slot number count circuit 211 is a circuit which calculates and holds a remaining number of slots of the frame.

The speech control slot generation circuit 207a compares, for each reception of a speech burst signal, the address of the slave station with the slave station addresses held in a slave station list storage circuit 212. The slave station list storage circuit 212 holds the addresses of all of the slave stations in the order in which poling is to be performed. After the speech control slot generation circuit 207a receives a speech burst from the last one of the slave stations recorded in the slave station list storage circuit 212, that is, receives speech burst signals from all of the slave stations, it transfers the control to a packet control slot generation circuit 210a.

The packet control slot generation circuit 210a successively takes out the slave station addresses and the packet reservation amounts from the packet reservation information list storage circuit 209 and determines allocation amounts. If the allocation amount is 0, the command is set to an instruction of transmission of a reservation burst, but if the allocation amount is not equal to 0, the command is set to an instruction of transmission of an information burst. The packet control slot generation circuit 210a generates control slots based on the commands and the allocation amounts and stores the control slots into the transmission control slot list storage circuit 214, and then writes information of the slots to be used into the transmission slot information list storage circuit 213. Further, the packet control slot generation circuit 210a informs the slot number count circuit 211 of the number of slots to be used. If an available slot no longer remains, the slot number count circuit 211 causes the packet control slot generation circuit 210a to stop the processing and initializes the remaining slot number held therein.

The transmission circuit 215 successively reads out the stored information of the transmission slot information list storage circuit 213 from the top after starting transmission of a transmission frame. If the slot to be transmitted is a control slot, a control slot is taken from the transmission control slot list storage circuit 214, but if the slot to be transmitted is a speech data slot, a slave station address is designated from the transmission data processing circuit 216 to take a speech data slot from the transmission data processing circuit 216. Otherwise, if the slot to be transmitted is a packet data slot, a packet data slot is taken from the transmission data processing circuit 216, and the slot thus taken out is transmitted into the descending circuit.

Figure 8:
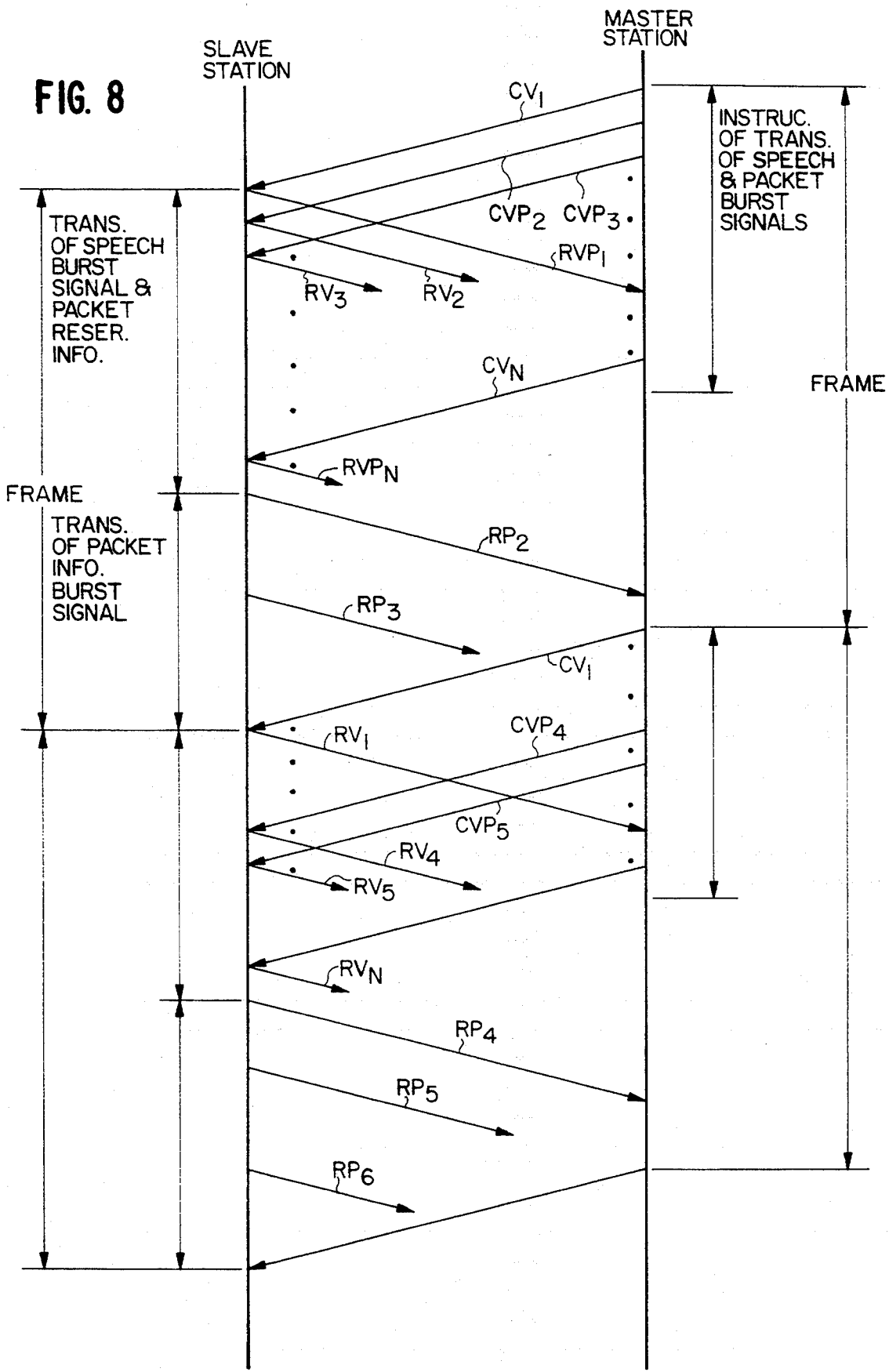
FIG. 8 is a sequence chart illustrating the procedure of a third embodiment of the present invention.

FIG. 8 is a control sequence diagram between a master station and slave stations showing a third embodiment of an access system according to the present invention. One control signal to be transmitted from the master station to the slave stations includes both control information regarding speech and control information regarding a packet. Control regarding speech is an instruction of transmission either of a reservation burst signal or an information burst signal. Control regarding a packet is either permission for transmission of reservation information or an instruction of transmission of an information burst. When the control information is an instruction of transmission of an information burst signal of a packet, it designates a packet transmission timing. The master station transmits, for each frame, the control signal described above to all of the slave stations. In FIG. 8, an instruction of transmission of a speech burst signal to each slave station and permission of transmission of packet reservation information are denoted by CVn, and an instruction of transmission of a speech burst signal and a packet information burst signal is denoted by CVPn.

Each of the slave stations transmits a burst signal in accordance with a control signal from the master station. Here, a region into which packet reservation information is to be stored is prepared in advance for a speech reservation or information burst signal. When a control signal of an instruction of transmission of a speech burst signal and permission of transmission of packet reservation information are received from the master station, each of the slave stations transmits, when it has already transmitted packet reservation information, a speech reservation burst signal or a speech information burst signal similarly as in the second embodiment. In this instance, the region for packet reservation information in a speech burst signal is not used. On the other hand, when the slave station has not yet transmitted packet reservation information, it transmits a speech burst signal into which the packet reservation information is included. When an instruction of transmission of a speech burst signal and a packet information burst signal is received, a speech burst signal is transmitted first without using the region for packet reservation information, and then, at a timing designated in the control signal from the master station, an information burst signal including packet data and packet reservation information is transmitted.

In FIG. 8, transmission of a speech burst signal from a slave station is denoted by RVn; transmission of a speech burst signal and packet reservation information is denoted by RVPn; and transmission of a packet information burst signal is denoted by RPn. The master station performs, based on the reservation information included in the burst signals from the slave stations, allocation of the transmission right for a next frame in accordance with the allocation system described in the first embodiment. A control signal is transmitted to each of the slave stations at a timing based on the allocation. Meanwhile, the information burst transmission position of a packet is determined in accordance with the allocation. The packet information burst transmission timing of each of the slave stations is set later than transmission of speech burst signals of all of the slave stations.

FIG. 9 shows portions of the formats of signals in the ascending and descending circuits for realizing the access system of the third embodiment which are different from those in the second embodiment. The formats of data slots in the ascending and descending circuits are both similar to those in the second embodiment.

The control slot for a speech burst signal for the ascending circuit includes, in addition to the fields in the second embodiment, a field for a packet reservation amount. The control slot for a packet burst signal is similar to that in the second embodiment. The control slot for the descending circuit includes, in contrast with the second embodiment, both control information for speech and control information for a packet in one control slot. The control slot includes a frame bit, a control slot/data slot identification bit, a command, an allocation amount to speech, a transmission amount of speech, an allocation amount to a packet, a transmission timing of a packet, and a CRC. The command includes three kinds of commands including an instruction of transmission of a speech reservation burst and permission of transmission of packet reservation information, an instruction of transmission of a speech information burst and permission of packet reservation information, and an instruction of transmission of a packet information burst.

Next, operation of the slave stations and the master station in the present embodiment will be described. The construction of the system is similar to that shown in FIG. 5.

Figure 10:
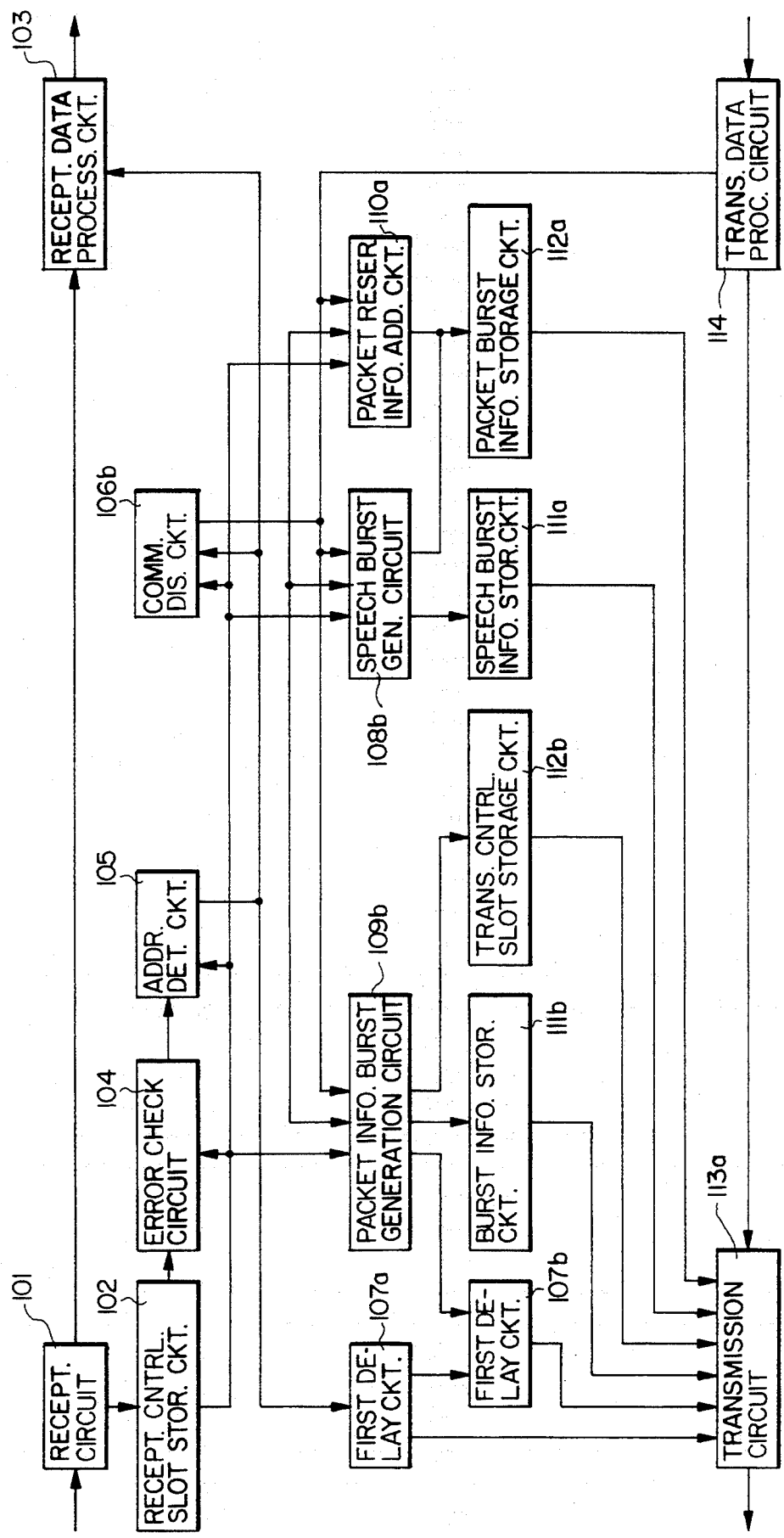
FIG. 10 is a block diagram illustrating the functions of a slave station of the third embodiment of the present invention.

A functional block diagram of a slave station in the third embodiment is shown in FIG. 10. Operation of the slave station is similar to that in the second embodiment up to activation of a command discrimination circuit 106b. The present embodiment is different from the second embodiment in that the command discrimination circuit 106b extracts the command field of a reception control slot to activate a speech burst generation circuit 108b, and when the command regarding the packet is permission of transmission of packet reservation information, a packet reservation information addition circuit 110 is activated, but when the command regarding the packet is an instruction of transmission of a packet information burst, a packet information burst generation circuit 109b is activated. The operation of the speech burst generation circuit 108b is similar to that of the second embodiment, and after operation, the result is written into a speech control slot storage circuit 112a and a speech burst information storage circuit 111a. When the slave station is waiting for transmission of packet reservation information, a packet reservation information addition circuit 110a takes out the reservation amount of the packet from the transmission data processing circuit 114 and writes it into the speech control slot storage circuit 112a. The packet information burst generation circuit 109b extracts the allocation amount of the packet from the reception control slot, takes out the packet reservation amount from the transmission data processing circuit 114 and produces a control slot. The control slot produced is stored into a packet control slot storage circuit 112b, and the number of packets to be transmitted is stored into the packet burst information storage circuit 111b. Further, the packet information burst generation circuit 109b extracts the field for a packet transmission position from the reception control slot and sets a packet burst transmission timing to a second delay circuit 107b.

When the speech burst transmission timing comes, the first delay circuit 107a instructs a transmission circuit 113a of transmission of a speech burst signal and informs the second delay circuit 107b that a speech burst signal has been transmitted. When the instruction of transmission of a speech burst signal is received from the first delay circuit 107a, the transmission circuit 113a transmits the speech control slot and the speech data slots, which have been taken out from the transmission data processing circuit 114 in response to the speech burst information storage circuit 111a, into the ascending circuit. Where a packet transmission timing is set in the second delay circuit 107b, after starting of transmission of a speech burst signal is informed from the first delay circuit 107a, the second delay circuit 107b instructs, when the timing set by the packet information burst generation circuit 109b comes, the transmission circuit 113a of transmission of a packet information burst signal. When the instruction of transmission of a packet information burst signal is received from the first delay circuit 107a, the transmission circuit 113a transmits a packet control slot and the packet data slots, which have been taken from the transmission data processing circuit 114 in response to the packet burst information storage circuit 111b, into the ascending circuit.

Figure 11:
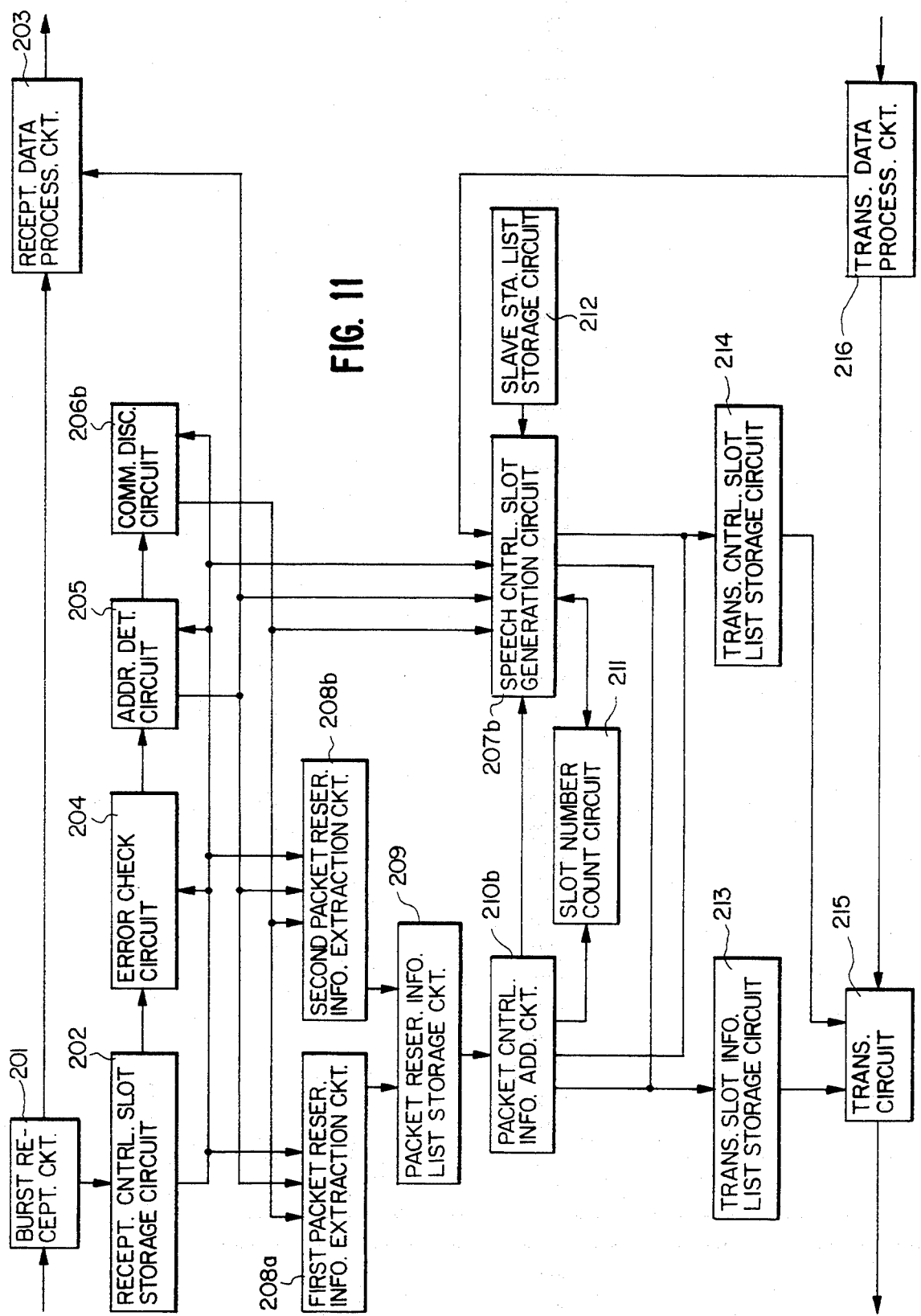
FIG. 11 is a block diagram illustrating the functions of the master station of the third embodiment of the present invention.

FIG. 11 is a functional block diagram of the master station of the third embodiment. The operation of the master station is similar to that of the second embodiment up to activation of the command discrimination circuit 206a. The command discrimination circuit 206a extracts the command field from a reception control slot, and activates, when the command is an instruction of transmission of a speech burst signal and packet reservation information, a speech control slot generation circuit 207b and a second packet reservation information extraction circuit 208b, but when the command is an instruction of transmission of a packet burst signal, the command discrimination circuit 206a activates a first packet reservation information extraction circuit 208a. Operation of the speech control slot generation circuit 207b and the first packet reservation information extraction circuit 208a is similar to that of the second embodiment. The second packet reservation information extraction circuit 208b extracts a packet reservation amount from a control slot of a speech burst signal having packet reservation information, and stores the slave station address and the packet reservation amount into the packet reservation information list storage circuit 209. The speech control slot generation circuit 207b transfers the control to a packet control information addition circuit 210b after it completes its reception of speech bursts from all of the slave stations.

The packet control information addition circuit 210b successively takes the slave station addresses and the packet reservation amounts from the packet reservation information list storage circuit 209 and determines allocation amounts for them. If the allocation amount is 0, the command regarding the packet is set to permission of transmission of reservation information, but if the allocation amount is not equal to 0, the command regarding the packet is set to an instruction of transmission of an information burst. Further, when the command regarding the packet is an instruction of transmission of a packet information burst, the packet transmission timing for the slave station is determined in accordance with the allocation to it. Thereafter, the command as well as the packet allocation amount and the packet transmission timing are written into a control slot destined for the slave station which is stored in the transmission control slot list storage circuit 214. Further, the packet control information addition circuit 210b informs the slot number count circuit 211 of the number of slots used. When available slots are used up, the slot number count circuit 211 causes the packet control information addition circuit 210b to stop the processing described above and initializes the number of remaining slots. The operation of the transmission circuit 215 is similar to that in the second embodiment.

Figure 12:
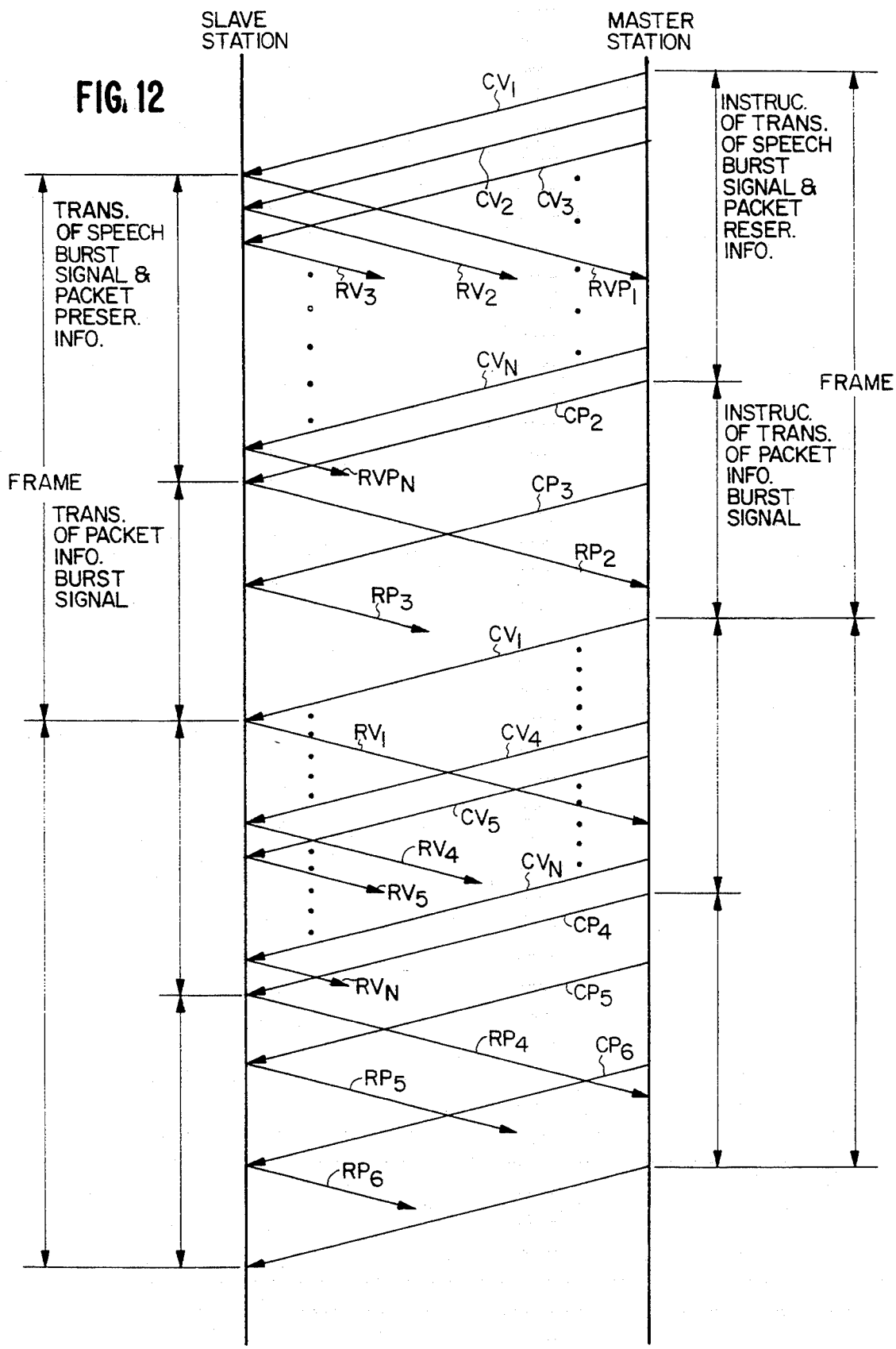
FIG. 12 is a sequence chart illustrating the procedure of a fourth embodiment of the present invention.

FIG. 12 is a control sequence diagram between a master station and slave stations showing a fourth embodiment of an access system according to the present invention. The control signal to be transmitted from the master station to the slave stations includes three kinds of signals including an instruction of transmission of a speech reservation burst signal and permission of transmission of packet reservation information, an instruction of transmission of a speech information burst signal and permission of transmission of packet reservation information, and an instruction of transmission of a packet information burst signal. In the former half of a frame, the master station transmits to all of the slave stations a control signal of an instruction of transmission of a speech burst signal and permission of transmission of packet reservation information. In the remaining region of the frame, the master station transmits a control signal of an instruction of transmission of a packet information burst. In FIG. 12, an instruction of transmission of a speech burst signal and permission of transmission of packet reservation information are denoted by CVn, and an instruction of transmission of a packet information burst signal is denoted by CPn.

Each of the slave stations transmits a speech reservation burst signal, a speech information burst signal and a packet information burst signal in response to the instruction of the command. Here, a region for storing packet reservation information is prepared for a speech reservation or information burst signal similarly as in the third embodiment, and when a speech burst signal is to be transmitted, if the slave station has not transmitted packet reservation information, it transmits a speech burst signal into which packet reservation information is included. In FIG. 12, transmission of a speech burst signal from a slave station is denoted by RVn; transmission of a speech burst signal and packet reservation information is denoted by RVPn; and transmission of a packet information burst signal is denoted by RPn. The master station performs, based on the reservation information included in burst signals from the slave stations, allocation of the transmission right for a next frame in accordance with the allocation system described in the first embodiment. Each control signal is transmitted to each of the slave stations at a timing based on the allocation.

The formats of signals in the ascending and descending circuits are similar to those in the second embodiment. However, the control slot for an ascending signal includes three kinds of slots for transmission of a speech reservation burst signal and packet reservation information, transmission of a speech information burst signal and packet reservation information, and transmission of a packet information burst signal. The control slot for a descending signal includes three kinds of slots for an instruction of transmission of a speech reservation burst signal and permission of transmission of packet reservation information: an instruction of transmission of a speech information burst signal and permission of transmission of packet reservation information, and an instruction of transmission of a packet information burst signal.

Next, operation of the slave stations and the master station in the fourth embodiment will be described. The construction of the system is similar to that shown in FIG. 5.

Figure 13:
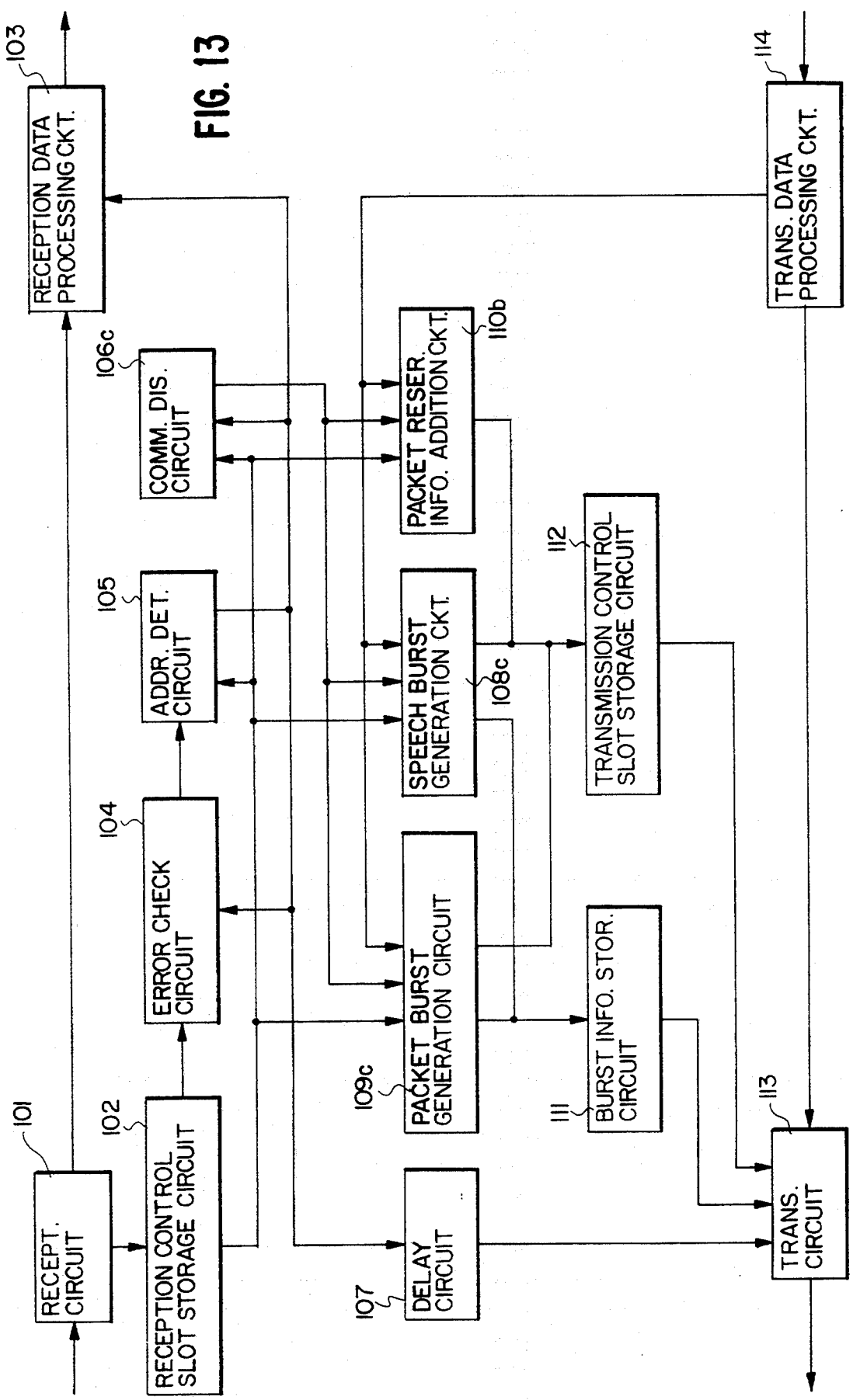
FIG. 13 is a block diagram illustrating the functions of a slave station of the fourth embodiment of the present invention.

A functional block diagram of a slave station of the fourth embodiment is shown in FIG. 13. Operation of the slave station is similar to that of the second embodiment up to activation of a command discrimination circuit 106c. The present embodiment is different from the second embodiment in that the command discrimination circuit 106c extracts the command field of a reception control slot, and when the command is an instruction of transmission of a speech burst signal and permission of transmission of packet reservation information, a speech burst generation circuit 108c and a packet reservation information addition circuit 110b are activated, but when the command is an instruction of transmission of a packet information burst, a packet information burst generation circuit 109c is activated.

The operation of the speech burst generation circuit 108c is similar to that of the second embodiment. When the slave station is waiting for transmission of packet reservation information, the packet reservation information addition circuit 110b takes the reservation amount of the packet from the transmission data processing circuit 114 and writes it into a control slot generated by the speech burst generation circuit 108c. The operation of the packet information burst generation circuit 109c is similar to that of the second embodiment except that only an information burst signal is generated. Operation of the transmission circuit 113 is similar to that of the second embodiment.

Figure 14:
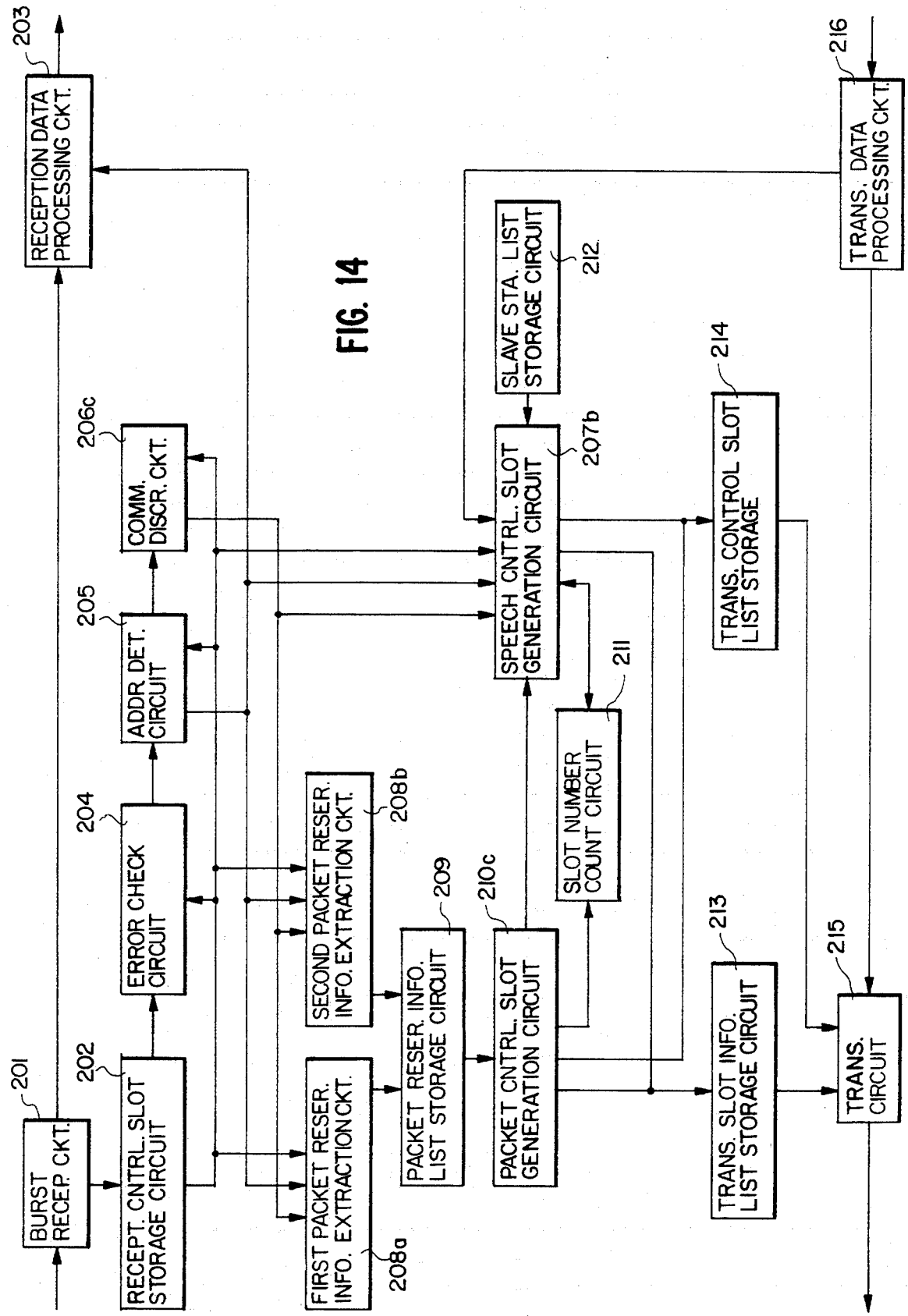
FIG. 14 is a block diagram illustrating the functions of the master station of the fourth embodiment of the present invention.

FIG. 14 is a functional block diagram of the master station of the fourth embodiment. Since the format of an ascending signal from a slave station is the same as in the third embodiment, processing of an ascending signal is similar to that in the third embodiment. The fourth embodiment differs from the third embodiment in the generation of a descending signal, and the fourth embodiment employs a packet control slot generation circuit 210c in place of the packet control information addition circuit 210b in the third embodiment. The packet control slot generation circuit 210c successively takes the slave station addresses and the packet reservation amounts from the packet reservation information list storage circuit 209 and determines allocation amounts for them. If the packet allocation amount is 0, the information of a next slave station is taken from the packet reservation information list storage circuit 209, but if the packet allocation amount is not equal to 0, a control slot for an instruction of transmission of a packet information burst is produced and written into the transmission control slot list storage circuit 214 and the transmission slot information list storage circuit 213. Further, the packet control slot generation circuit 210c informs the slot number count circuit 211 of the number of slots used. When available slots are used up, the slot number count circuit 211 causes the packet control slot generation circuit 210c to stop the processing described above and initializes the remaining slot number again. The operation of the transmission circuit 215 is similar to that of the second embodiment.

As described above, since the access system according to the present invention allocates for each frame the transmission right for constant bit rate data to all of the slave stations and allocates all of the remaining portions of the circuit to variable bit rate data, it is advantageous in that transfer of constant bit rate data is ensured irrespective of traffic conditions, the delay upon starting of transfer of constant bit rate data is restricted to within a frame period, and furthermore, both constant bit rate data and variable bit rate data can be accommodated with high efficiency of circuit utilization.

What is claimed is:

1. An access system, comprising:
a master station and a plurality of slave stations;
a channel of the broadcasting type for allowing communication from said master station to all of said slave stations; and
a multiple access channel for allowing communication from all of said slave stations to said master station,
wherein each of said slave stations transmits, in accordance with control information from said master station, reservation information for acquirement of a transmission right or both the reservation information and data to said master station by way of said multiple access channel, and said master station, based on the reservation information received from said slave stations, transmits to each of said slave stations that do not request the transmission right, control information of an instruction of transmission of the reservation information, and transmits to each of said slave stations which request the transmission right, control information of an instruction of transmission of the reservation information and data, by way of said channel of the broadcasting type, said access system characterized in that
each of said slave stations requests from said master station, the transmission right for constant bit rate data and variable bit rate data, and
for each request for the transmission right for constant bit rate data from each of said slave stations, said master station allocates the transmission right for constant bit rate data to all of the slave stations for each transmission period for constant bit rate data which depends upon the transmission bit rate of the constant bit rate data, and
for a request for the transmission right for variable bit rate data from each of said slave stations, after the allocation of the transmission right for constant bit rate data, said master station successively allocates the transmission right for variable bit rate data to a non-used region within the transmission period for the constant bit rate data in the order in which the requests for the transmission right for variable bit rate data were accepted, thereby accommodating the constant bit rate data and the variable bit rate data in the transmission period.

2. The access system as claimed in claim 1, further characterized in that
said master station first transmits within the transmission period for constant bit rate data control information of an instruction of transmission of the reservation information for constant bit rate data or both the reservation information and data to all of said slave stations, and then
transmits, to each of said slave stations to which said master station has determined to allocate the transmission right for variable bit rate data in accordance with the allocation system for the transmission right recited in claim 1, control information of an instruction of transmission of the reservation information for variable bit rate data or both the reservation information and data, while
each of said slave stations transmits, in accordance with designations from said master station, the reservation information for constant bit rate data or both the reservation information and data or else the reservation information for variable bit rate data or both the reservation information and data, thereby separating access of the constant bit rate data from access of the variable bit rate data.

3. The access system as claimed in claim 1, further characterized in that
   said master station transmits to all of said slave stations within the transmission period for constant bit rate data control information including, for the constant bit rate data, an instruction of transmission of the reservation information or both the reservation information and data, and for the variable bit rate data, permission of transmission of the reservation information or an instruction of transmission of both the reservation information and data, or else for an instruction of transmission of both the reservation information for variable bit rate data and data, transmission timing information for the variable bit rate data, while,
   when the control information is an instruction of transmission of the reservation information for constant bit rate information or both the reservation information and data and permission of transmission of the reservation information for variable bit rate data and the reservation information for variable bit rate data has been transmitted, each of said slave stations transmits the reservation information for constant bit rate data or both the reservation information and data, but when the control information is an instruction of transmission of the reservation information for constant bit rate data or both the reservation information and data and permission of transmission of the reservation information for variable bit rate data and the reservation information for variable bit rate data has not been transmitted, transmits the reservation information for constant bit rate data or both the reservation information and data and the reservation information for variable bit rate data; but otherwise,
   when the control information is an instruction of transmission of the reservation information for constant bit rate data or both the reservation information and data and an instruction of transmission of both the reservation information for variable bit rate data and data, transmits the reservation information for constant bit rate data designated by the control information or both the reservation information and data, and then, when the timing designated by the transmission timing information comes, transmits both the reservation information for variable bit rate data and data, whereby
   burst transmission control of the fixed rate information and the variable bit rate data is performed with a single piece of control information in transmission control from said master station to each of said slave stations, and sole transmission of the reservation information for variable bit rate data from any of said slave stations to said master station is not performed.

4. The access system as claimed in claim 1, further characterized in that:
   within the transmission period for constant bit rate data, said master station;
   first transmits, to all of said slave stations, control information of an instruction of transmission of the reservation information for constant bit rate data and permission of transmission of the reservation information for variable bit rate data or control information of an instruction of transmission of both the reservation information for constant bit rate data and data and permission of transmission of the reservation information for variable bit rate data, and then;
   transmits control information of an instruction of transmission of both the reservation information for variable bit rate data and data to each of those of said slave stations to which said master station has allocated the transmission right for variable bit rate data in accordance with the allocation system for the transmission right recited in claim 1, while;
   each of said slave stations transmits the reservation information for constant bit rate data when the control information is an instruction of transmission of the reservation information for constant bit rate data and permission of transmission of the reservation information for variable bit rate data and the reservation information for variable bit rate data has been transmitted, but;
   when the control information is an instruction of transmission of the reservation information for constant bit rate data and permission of transmission of the reservation information for variable bit rate data but the reservation information for variable bit rate data has not been transmitted, transmits the reservation information for constant bit rate data and the reservation information for variable bit rate data, but otherwise;
   when the control information is an instruction of transmission of both the reservation information for constant bit rate data and data and permission of transmission of the reservation information for variable bit rate data and the reservation information for variable bit rate data has been transmitted, transmits the reservation information for constant bit rate data and data, but;
   when the control information is an instruction of transmission of both the reservation information for constant bit rate data and data and permission of transmission of the reservation information for variable bit rate data and the reservation information for variable bit rate data has not been transmitted, transmits the reservation information for constant bit rate data and data as well as the reservation information for variable bit rate data, but;
   when the control information is an instruction of transmission of both the reservation information for variable bit rate data and data, transmits the reservation information for variable bit rate data and data.

5. In an access system which includes: a master station and a plurality of slave stations; a channel of the broadcasting type for allowing communication from said master station to all of the slave stations; and a multiple access channel for allowing communication from all of said slave stations to said master station,
   a method for communicating between all of said slave stations and said master station, the method comprising the steps of:
   transmitting from each of said slave stations, in accordance with control information from said master station, reservation information for acquirement of a transmission right or both the reservation information and data to said master station by way of said multiple access channel,
   transmitting from said master station, based on the reservation information received from said slave stations, to each of said slave stations that do not request the transmission right, control information of an instruction of transmission of the reservation information, and transmitting from said master station to each of said slave stations which request the transmission right, control information of an instruction of transmission of the reservation information and data, by way of said channel of the broadcasting type, and each of said slave stations requesting of said master station, the transmission right for constant bit rate data and variable bit rate data, said master station allocating, for each request for the transmission right for constant bit rate data from each of said slave stations, the transmission right for constant bit rate data to all of the slave stations for each transmission period for constant bit rate data which depends upon the transmission bit rate of the constant bit rate data, and after the allocating of the transmission right for constant bit rate data, said master station successively allocating, for a request for the transmission right for variable bit rate data from each of said slave stations, the transmission right for variable bit rate data to a non-used region within the transmission period for the constant bit rate data in the order in which the requests for the transmission right for variable bit rate data were accepted, thereby accommodating the constant bit rate data and the variable bit rate data in the transmission period.

6. The method according to claim 5, further comprising the steps of:

said master station transmitting, within the transmission period for constant bit rate data, control information of an instruction of transmission of the reservation information for constant bit rate data or both the reservation information and data to all of said slave stations;

said master station transmitting to each of said slave stations to which said master station has allocated the transmission right for variable bit rate data, control information of an instruction of transmission of the reservation information for variable bit rate data or both the reservation information and data;

each of said slave stations transmitting, in accordance with designations from said master station, the reservation information for constant bit rate data or both the reservation information and data or else the reservation information for variable bit rate data or both the reservation information and data, thereby separating access of the constant bit rate data from access of the variable bit rate data.

7. The method according to claim 5, further comprising the steps of:

said master station transmitting to all of the slave stations within the transmission period for constant bit rate data, control information including, for the constant bit rate data, an instruction of transmission of the reservation information or both the reservation information and data, and for the variable bit rate data, permission of transmission of the reservation information or an instruction of transmission of both the reservation information and data, or else for an instruction of transmission of both the reservation information for variable bit rate data and data, transmission timing information for the variable bit rate data;

when the control information is an instruction of transmission of the reservation information for constant bit rate information or both the reservation information and data and permission of transmission of the reservation information for variable bit rate data and the reservation information for variable bit rate data has been transmitted, each of said slave stations transmitting the reservation information for constant bit rate data or both the reservation information and data;

when the control information is an instruction of transmission of the reservation information for constant bit rate data or both the reservation information and data and permission of transmission of the reservation information for variable bit rate data and the reservation information for variable bit rate data has not been transmitted, each of said slave stations transmitting the reservation information for constant bit rate data or both the reservation information and data and the reservation information for variable bit rate data;

when the control information is an instruction of transmission of the reservation information for constant bit rate data or both the reservation information and data and an instruction of transmission of both the reservation information for variable bit rate data and data, each of said slave stations transmitting the reservation information for constant bit rate data designated by the control information or both the reservation information and data, and then, when the timing designated by the transmission timing information comes, transmitting both the reservation information for variable bit rate data and data, whereby burst transmission control of the fixed rate information and the variable bit rate data is performed with a single piece of control information in transmission control from said master station to each of said slave stations, and sole transmission of the reservation information for variable bit rate data from any of said slave stations to said master station is not performed.

8. The method according to claim 5, further comprising the steps of:

within the transmission period for constant bit rate data, said master station first transmitting, to all of said slave stations, control information of an instruction of transmission of the reservation information for constant bit rate data and permission of transmission of the reservation information for variable bit rate data or control information of an instruction of transmission of both the reservation information for constant bit rate data and data and permission of transmission of the reservation information for variable bit rate data;

transmitting control information of an instruction of transmission of both the reservation information for variable bit rate data and data to each of those of said slave stations to which said master station has allocated the transmission right for variable bit rate data;

each of said slave stations transmitting the reservation information for constant bit rate data when the control information is an instruction of transmission of the reservation information for constant bit rate data and permission of transmission of the reservation information for variable bit rate data and the reservation information for variable bit rate data has been transmitted;

each of said slave stations transmitting the reservation information for constant bit rate data and the reservation information for variable bit rate data when the control information is an instruction of transmission of the reservation information for constant bit rate data and permission of transmission of the reservation information for variable bit rate data but the reservation information for variable bit rate data has not been transmitted;

each of said slave stations transmitting the reservation information for constant bit rate data and data when the control information is an instruction of transmission of both the reservation information for constant bit rate data and data and permission of transmission of the reservation information for variable bit rate data and the reservation information for variable bit rate data has been transmitted;

each of said slave stations transmitting the reservation information for constant bit rate data and data as well as the reservation information for variable bit rate data when the control information is an instruction of transmission of both the reservation information for constant bit rate data and data and permission of transmission of the reservation information for variable bit rate data and the reservation information for variable bit rate data has not been transmitted;

each of said slave stations transmitting the reservation information for variable bit rate data and data when the control information is an instruction of transmission of both the reservation information for variable bit rate data.

* * * * *

UNITED STATES PATENT AND TRADEMARK OFFICE
CERTIFICATE OF CORRECTION

PATENT NO. : 5,440,555
DATED : August 8, 1995
INVENTOR(S) : Morihisa Momona

It is certified that error appears in the above-indentified patent and that said Letters Patent is hereby corrected as shown below:

Column 20, line 15, after "data" insert —and data—.

Signed and Sealed this

Thirtieth Day of July, 1996

Attest:

BRUCE LEHMAN

Attesting Officer          Commissioner of Patents and Trademarks